Patented Apr. 12, 1938

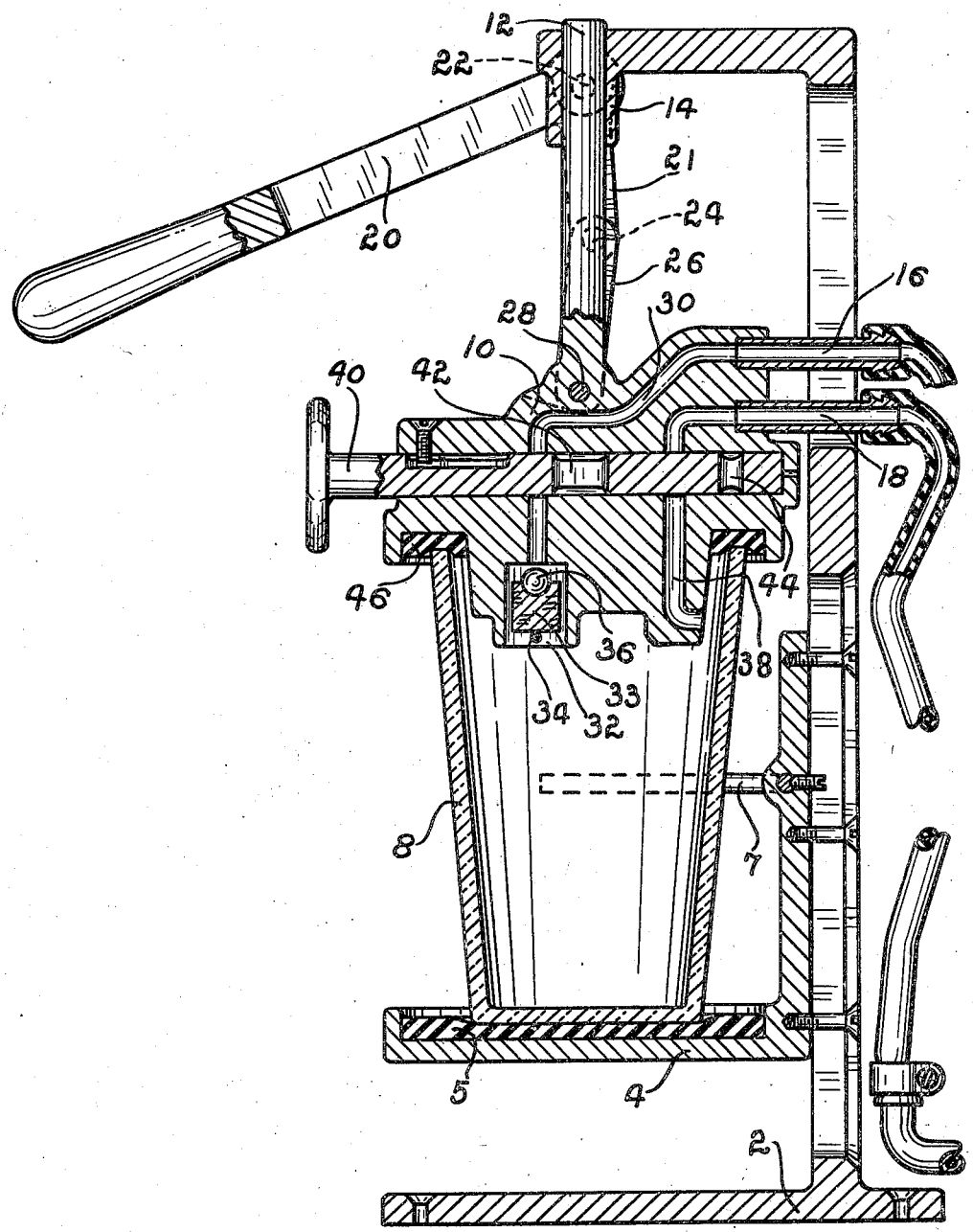

2,113,887

UNITED STATES PATENT OFFICE 2,113,887

BEVERAGE DISPENSING FAUCET

Thomas A. Hutsell, Seattle, Wash.

Application September 19, 1934, Serial No. 744,732

1 Claim. (Cl. 225—8)

My present invention relates to a method for the dispensing and measuring of effervescent or gas-charged liquids.

A particular adaptation of my method lends itself particularly well to the dispensing of draft beer. Consequently for the sake of clearness of description I prefer to explain my method as employed in the dispensing of beer, it will be understood, it is believed, that any gas-containing or gas-producing liquid could be dispensed in a similar manner.

All beer contains carbon-dioxide gas in solution. It is a natural product of the brewing process and constitutes the life of the beer. When this gas goes out of solution it leaves the beer flat and it soon sours. The carbon-dioxide is kept in solution, normally, by keeping the beer at a reduced temperature or under pressure, or a combination of both. Further, under present known methods, it is not possible to measure the beer as a liquid or to dispense exact amounts, as the beer is subject to violent agitation and aeration which forms excessive amounts of coarse and unstable foam.

My method consists of keeping the beer at a pressure sufficiently high to retain the carbon dioxide in solution thereby preserving the beer and then to measure the beer under nearly its full initial pressure which will not permit the forming of foam, the beer is thus measured as a liquid and can, by means of a suitable counting mechanism, be recorded in any desirable unit of volume. After a measured amount of beer has been drawn into a suitable container means are provided to cut off the source of supply to the measuring chamber and allow the beer to expand, after it becomes nearly static, to a low pressure which liberates some of the included carbon-dioxide which forms foam, without aeration or excessive agitation. This results in foam of a fine texture.

The principal object of my present invention, therefore, is to provide a method of maintaining an effervescent beverage or liquid, in its manufactured condition and dispensing the same without loss of its gaseous content. This purpose is obtained by retaining the liquid at a sufficiently high pressure and at a proper temperature in an original container and cooling coils, so as to prevent loss of the original gases and, through a mechanical dispensing device, measure and record prior to effervescent expansion, the amount of liquid passed. The liquid is next reduced to a nearly static or unagitated condition and then the pressure is reduced to allow part of the included gas to escape and form foam. The agitation, at the time of expansion, will determine, other factors being constant, the amount of foam formed, as the more the liquid is agitated the greater will be the resultant release of gas. The liquid is thus delivered into the retail containers or glasses in accurately predetermined amounts, with the desired proportion of liquid and foam; thus making it possible to deliver the beverage, or liquid, in a condition to retain the desired proportion of their original gaseous content.

Other and more specific objects will be apparent from the following description taken in connection with the accompanying drawing, wherein the figure is an elevation of my dispensing means, certain parts being broken away to better illustrate the construction.

In carrying out the method of dispensing liquids, as outlined, I find it necessary to provide an improved form of dispensing equipment. One form of dispenser that has proven very satisfactory is disclosed in the accompanying drawing throughout which like reference characters indicate like parts. This device consists of the main frame or base 2 which may be fixedly secured to a counter or bar and which in turn is adapted to support the various parts of the device. Adjustably secured to frame 2 is a glass or dispensing receptacle bracket 4. This I prefer to provide with a yieldable or resilient pad 5 to the end that there will be no danger of cracking the glass if ordinary beverage glasses are used as the measuring chamber. Secured to bracket 4 may be any form of centering means as 7 which will provide that the particular glass used will be uniformly centered. Disposed coaxially above the beverage glass as 8, which has been centered by centering means 7, is the dispenser head 10.

Dispenser head 10 is disposed for movement along a vertical axis and is guided therein by member 12 which, in turn, is slidable within bracket 14 that is formed as part of base 2. The head is held against rotary movement about guide 12 by fluid conducting pipes 16 and 18 operating in a slot in base 2. Any convenient means may be employed to raise and lower head 10 as, for instance, the toggle link arrangement shown, wherein lever 20 has formed as part of it the bell crank lever 21 which is pivotally supported at 22. Pivotally secured to lever 21, as at 24, is a toggle link 26 which in turn is pivotally secured at 28 to head 10. Following the principles of toggle presses a movement of lever 20 about pivot 22, in an upward direction, will raise the head 10 upwardly so that it will clear entirely the upper rim of glass 8. When in its depressed position as indicated in Figure 1, however, by having pivot 24 swing past the line joining pivots 22 and 28, a toggle lock is provided, as is common in such mechanisms, so that any upward force on head 10 will only tend to more securely lock the mechinism in position.

Pipe 16 in the accompanying drawing is intended to carry a gas under pressure, either air, carbon dioxide or any other suitable gas. This leads into passageway 30 formed within head 10, down to a discharge opening 32. Disposed within this opening is a float valve arrangement consisting of a cork float 33 which is held within chamber 32 by means of a support pin 34 and carries, embedded in its upper surface a ball 36 which, when it engages the end of passage 30 effectively seals the same even though cork 33 does not assume a perfectly aligned position.

Pipe 18 is intended as the beer supply tube. This connects with passage 38 which, in the present instance, is shown as discharging against the side of glass 8. Now it has been found that the arrangement of the discharge opening tends to regulate the amount of turbulence caused within the discharged liquid. It, therefore, follows that by varying the manner in which this discharge is made, a direct control on the turbulence of the liquid is effected and, in the case of beer particularly, this can be made to govern the amount of foam. A piston valve 40 is provided to control both lines 16 and 18. The valve orifice 42, to handle the air, has been made considerably longer than orifice 44. This provides that it will be the first to be opened when the valve is pulled out and will be the last to be closed when the valve is shoved in.

The inner surface of head 10 has an annular recess in which a resilient packing as 46 is disposed so as to both form a complete seal for the top of the glass and, further, to prevent damage to the glass when pressure is placed upon the same. As will be observed in Figure 1 I have provided that head 10 extends down into the glass. This is to provide that a minimum of air space will remain in the glass when it has been filled with the desired amount of liquid. The purpose of this being to prevent the wasting of large amounts of gas under relatively high pressure.

*Method of operation*

In operating my device a supply line from the keg or other container is connected to 18. This line will carry the full pressure necessary to retain the carbon dioxide in the beer even though violently agitated. This will vary normally from 13 pounds for a corresponding beer temperature of 40 degrees Fahrenheit up to 31 pounds corresponding to a beer temperature of 65 degrees Fahrenheit.

Following out the principles of my present method I find it desirable to use the customer's glass as the receiver for the drawn beer. It has been quite definitely determined that the foam produced on beer is a function of the turbulence within the beer when the beer is not subject to sufficient pressure to retain the included gas. The pressure, however, in the gas line 16 must be somewhat less than the pressure of the beer, usually from two to five pounds. This differential pressure between the beer and the gas line can be automatically maintained by various devices now available on the market.

When it is desired to draw a glass of beer the first action must be to enclose the glass 8 firmly, so as to withstand the full pressure of the beer, as by means of head 10. The gas is then admitted until the full pressure, as provided by the pressure differential, is in the glass. The next operation is to open the beer line 18, so that the beer will flow into the glass against the gas pressure already present. Now it will be apparent, it is believed, that the beer coming in, will, because of its higher pressure, displace the gas pressure in the glass, forcing it back into its original container. This will continue until float 33 closes the gas line, then because of the limited air space in the top of the glass the air thus trapped will be compressed until the air pressure balances the beer pressure and stops any further flow into the glass. In so doing, however, the full pressure of the gas is on the beer and this must be sufficiently high so that, at the temperature employed, foaming cannot occur.

Now there are two factors to be considered at this point, one is the desirability of getting the beer into the glass quickly. This is a function of course of the size of the supply line and the differential pressure of which forces it into the glass. It naturally follows that the higher the gas pressure in proportion to the beer pressure the slower the flow of the beer, other factors being equal. If the beer merely balanced the gas pressure there will be no flow. Then as the gas pressure is dropped below the pressure of the beer the differential in pressure is the effective pressure driving the beer into the glass. It further follows that the pressure with which the beer is introduced the greater the turbulence and the greater the tendency to foam. If the pressure is maintained above the foaming point however no foam will be formed.

The next principle which is involved is the fact that if the beer is absolutely inert, without turbulence or agitation, the escape of carbon dioxide, even at atmospheric pressure, is relatively slow. At normal room temperatures and with the beer at, say 45 degrees, the beer will retain carbon-dioxide for periods up to an hour. If, however, the beer is stirred under this condition, or is shaken as a drink is mixed, for instance, a marked degree of foaming is produced which, within a fairly narrow range, is more or less proportional to the amount of agitation. It is this principle that is used in producing the amount of foam desired under my method. This fact indicates the desirability of using the customer's glass as a measuring chamber.

After the beer has been drawn into the glass, still under pressure, it must be allowed to come to rest to a degree at least. The exact time required for this quieting down of the drawn beer is a matter best determined by experiment with various types of beer. Normally, however, it is a matter of very few seconds. When the beer reaches the point where it is nearly quiet, head 10 is raised thus subjecting the beer only to atmospheric pressure, then the amount of turbulence which remains in the beer at the time it is exposed to atmospheric pressure will determine the amount of foam produced in the customer's glass. In dispensing it must be remembered, that the beer should be released to atmospheric pressure before all turbulence stops, otherwise there will be no foam formed without further induced agitation. Beer, so drawn, is fully charged with carbon-dioxide and is a very satisfactory drink.

This completes the dispensing cycle in which the beer has been maintained under the desired higher pressure while in transit; it is measured as a liquid under pressure just slightly lower than transit pressure; the beer is allowed to come nearly to rest; it is reduced to atmospheric when just sufficient turbulence remains to produce the desired amount of foam and the beer has retained substantially all of the original carbon-dioxide either in solution or in the form of foam.

The foregoing description and the accompanying drawing is believed to clearly disclose a preferred embodiment of my invention but it will be understood that this disclosure is merely illustrative and that such changes in the invention may be made as are fairly within the scope and spirit of the following claim.

Having thus fully described my invention, what I claim as new and desire to secure by Letters Patent is:—

The combination of a frame including an upright member having a longitudinal slot therein; a supporting bracket carried by said frame; a dispenser head movably mounted on said frame having a face presented toward said bracket and provided with an annular gasket, and having conduits extending therethrough within the area circumscribed by said gasket; a piston valve slidable through said head and provided with ports alined with said conduits, one of said ports being of greater diameter than the other; connecting nipples communicating with said conduits and projecting from said frame and through said longitudinal slot; a toggle device secured to said frame and to said head for moving said frame toward said bracket and away from the same; a bearing carried by said frame above said head; and a stem projecting from said head and slidable through said bearing.

THOMAS A. HUTSELL.